United States Patent [19]

McNaull

[11] Patent Number: 4,768,888

[45] Date of Patent: Sep. 6, 1988

[54] UNITARY BEARING MEMBER AND MOTOR INCORPORATING THE SAME

[75] Inventor: Michael H. McNaull, Ashland, Ohio

[73] Assignee: McNeil (Ohio) Corporation, St. Paul, Minn.

[21] Appl. No.: 43,886

[22] Filed: Apr. 29, 1987

[51] Int. Cl.⁴ .................. F16C 17/26; F16C 33/10; H02K 5/12; E21B 4/04

[52] U.S. Cl. .................. 384/129; 175/104; 310/87; 384/286; 384/313; 384/415; 417/423 R

[58] Field of Search .................. 384/97, 286, 287, 291, 384/299, 313, 315–317, 321, 322, 397, 415, 420, 192, 193, 200, 226, 129; 417/423 B, 423 H, 423 P, 423 A; 310/87–90, 112; 175/104, 105

[56] References Cited

U.S. PATENT DOCUMENTS

| | | | |
|---|---|---|---|
| 2,942,555 | 6/1960 | Pezzillo | 384/420 X |
| 2,991,837 | 7/1961 | Postlewaite | 384/313 X |
| 3,294,456 | 12/1966 | Williams et al. | 384/286 X |
| 3,742,595 | 7/1973 | Lykes | 310/87 X |
| 3,842,298 | 10/1974 | Schaefer | 310/87 |
| 3,947,153 | 3/1976 | Matthias et al. | 384/415 X |
| 4,329,122 | 5/1982 | Owada et al. | 384/420 X |
| 4,332,524 | 6/1982 | Smith | 384/322 X |
| 4,350,911 | 9/1982 | Wilson et al. | 384/200 X |
| 4,477,235 | 10/1984 | Gilmer et al. | 310/87 X |
| 4,575,315 | 3/1986 | Galais et al. | 310/87 X |

Primary Examiner—John Petrakes
Assistant Examiner—Thomas R. Hannon
Attorney, Agent, or Firm—Renner, Kenner, Greive, Bobak, Taylor & Weber

[57] ABSTRACT

A bearing system for a motor (10) having a housing (20) and a rotor shaft (25). The bearing system includes a first unitary bearing member (31) located proximate to a first end (17) of the motor (10), and rotatably receiving the rotor shaft (25). The first bearing member (31) has a body region (40), first and second outer radial alignment surfaces (35, 36) for aligning the body region (40) relative to the housing (20), a radial bearing surface (45) for resisting radial forces from the rotor shaft (25) and an axial bearing surface (54) for resisting axial forces in a first direction. A flange (33) secures the first bearing member (31) to the housing (20). A first bearing plate (56) is fixed to the rotor shaft (25) for rotation therewith. The first bearing plate (56) is positioned in opposition to the axial bearing surface (54) of the first bearing member (31). A second unitary bearing member (32) is axially displaced from the first bearing member (31) with the rotor shaft (25) rotatably received by and passing axially through the second bearing member (32). The second bearing member (32) has a body region (74), first and second outer radial alignment surfaces (72, 73) for aligning the body region (74) relative to the housing (20), a radial bearing surface (80) for resisting radial forces from the rotor shaft (25), and an axial bearing surface (87) for resisting axial forces in a second direction. A rim (69) secures the second bearing member (32) to the housing (20). A second bearing plate (90) is fixed to the rotor shaft (25) for rotation therewith. The second bearing plate (90) is positioned in opposition to the axial bearing surface (87) of the second bearing member (32).

16 Claims, 4 Drawing Sheets

FIG. I

UNITARY BEARING MEMBER AND MOTOR INCORPORATING THE SAME

TECHNICAL FIELD

The present invention relates generally to electric motors. More particularly, the present invention relates to motors for use in a submersible pump assembly. Specifically, the present invention relates to bearing members for use in submersible pump motors.

BACKGROUND ART

Submersible pump assemblies are widely used in well applications, as for example water wells for use in irrigation or residential systems. Generally, these pump assemblies include an axial discharge pump which is connected to a discharge pipe. The pump motor is carried coaxially below the pump with the motor shaft being coupled in-line to the pump impeller shaft. In such arrangement, the motor shaft carries a substantial axial load due to the weight of the rotor as well as hydraulic loading on the internal components of the pump. In addition, substantial radial loading is experienced by the motor as a result of the torque required to pump the column of water through the discharge pipe an elevation of 100 feet (30.48 m) or more.

The environment in which submersible pumps operate is quite harsh. The pump and motor are submerged in the water, or other well fluid. As such, the motor must be fluid-tight to avoid the well fluid from leaking into the motor housing and causing severe damage. Furthermore, the well casing limits the size of the diameter of the motor.

Because of these operating conditions, the pump motor must be relatively compact in size and capable of producing sufficient usable torque. Furthermore, the reliability of the motor must be significantly good, with a minimum of maintenance.

One of the principal problem areas in any motor is the bearings supporting the rotor shaft. The bearings must be capable of withstanding substantial radial and axial loads, as well as maintaining proper alignment of the rotor relative to the stator. It is also important that the bearings be of relatively low friction to avoid losses in the output power of the motor. In addition, the bearings need to be kept cool so as not to fail prematurely due to the heat generated when the motor is running.

These problems along with the harsh operating conditions and critical design parameters of submersible pump motors make the bearings for such motors of significant importance. One type of bearing assembly commonly found in submersible pump motors is referred to as a Kingsbury-type bearing. Such an assembly employs a stacked arrangement of brass, carbon and steel rings, shoe pads and bushings which provide radial and axial bearing support while also compensating for slight angular misalignment of the bearing housing. This type of bearing assembly, however, is expensive to manufacture and maintain inasmuch as each component must be individually machined to exact tolerances, from expensive material, and carefully assembled in a time-consuming process. Furthermore, failure of any one component may result in the total failure of the entire bearing assembly.

While considerable attention has been directed to the bearing assemblies of submersible pump motors, as yet no solution is known to provide bearings which are inexpensive to manufacture, reliable in operation and able to provide adequate support against axial and radial loadings.

DISCLOSURE OF THE INVENTION

It is, therefore, a primary object of the present invention to provide a bearing assembly for a submersible pump motor suitable to withstand axial and radial loads.

It is another object of the present invention to provide a bearing assembly, as above, which accurately aligns the rotor shaft relative to the motor housing and the stator.

It is still another object of the present invention to provide a bearing assembly, as above, which enables the motor to be made fluid-tight.

It is a further object of the present invention to provide a bearing assembly, as above, which is of simple construction and exhibits greater reliability in use.

It is yet another object of the present invention to provide a bearing assembly, as above, which has substantially low friction.

It is still a further object of the present invention to provide a bearing assembly, as above, which provides for cooling and lubricating fluids to circulate and coat the bearing contact surfaces.

It is also an object of the present invention to provide a submersible pump motor having bearing assemblies as disclosed herein.

These and other objects of the present invention, as well as the advantages thereof over existing and prior art forms, which will be apparent in view of the following specification, are accomplished by means hereinafter described and claimed.

In general, a bearing system for a motor having a housing and a rotor shaft includes a first unitary bearing member located proximate to a first end of the motor, and rotatably receiving the rotor shaft. The first bearing member has a body region, first and second outer radial alignment surfaces for aligning the body region relative to the housing, a radial bearing surface for resisting radial forces from the rotor shaft and an axial bearing surface for resisting axial forces in a first direction. Means are provided for securing the first bearing member to the motor housing. A first bearing plate is fixed to the rotor shaft for rotation therewith and is positioned in opposition to the axial bearing surface of the first bearing member. A second unitary bearing member is axially displaced from the first bearing member with the rotor shaft rotatably received by and passing axially through the second bearing member. The second bearing member also has a body region, first and second outer radial alignment surfaces for aligning the body region relative to the housing, a radial bearing surface for resisting radial forces from the rotor shaft, and an axial bearing surface for resisting axial forces in a second direction. Likewise, means are provided for securing the second bearing member to the housing. A second bearing plate is fixed to the rotor shaft for rotation therewith, and is positioned in opposition to the axial bearing surface of the second bearing member.

EXEMPLARY EMBODIMENT FOR CARRYING OUT THE INVENTION

Figure 1:
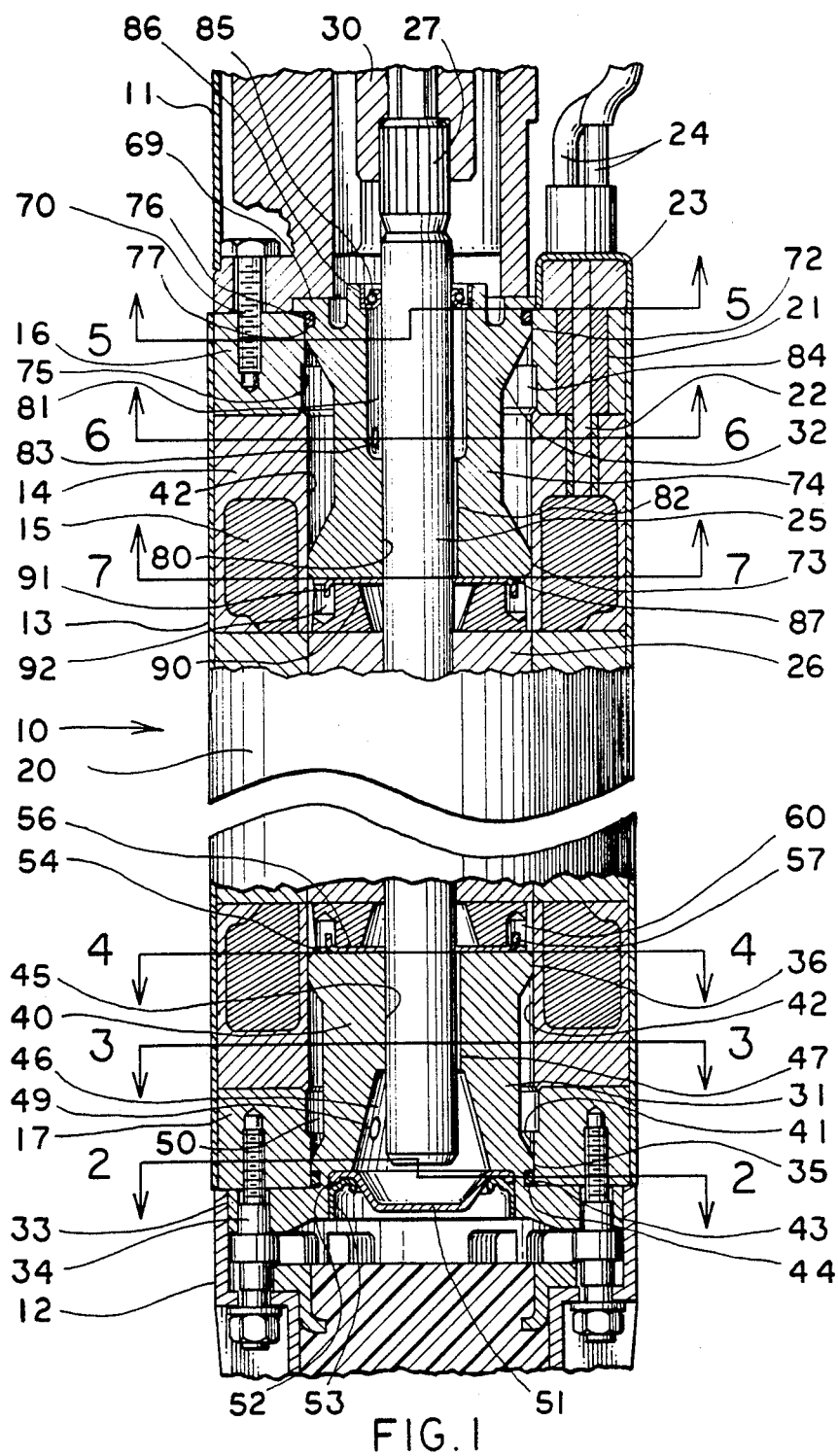
FIG. 1 is a fragmentary elevational view, partially in cross-section, of a submersible pump motor embodying the concept of the present invention.

A submersible pump motor, according to the concept of the present invention, is indicated generally by the numeral 10 in FIG. 1 of the accompanying drawings. The motor 10 is depicted as being connected at its upper end to a pump assembly 11; and it further is depicted as having a capacitor assembly 12 connected to its lower end, as is common in the art.

The motor 10, itself, has an outer shell 13 which holds the stator 14 embodying the windings 15 therein. Stator 14 is retained within shell 13, in part, by an upper annular housing ring 16 and a lower annular housing ring 17. Upper housing ring 16 includes an electrical access port 21 through which electrical connection, as for example with internal wiring 22, is achieved. A suitable fluid-tight electrical connector 23 is sealingly received in port 21 to interconnect the motor 10 with external power lines 24.

The assembly of shell 13, stator 14 and upper and lower housing rings 16, 17, collectively represent the motor housing 20. Furthermore, being part of a submersible pump motor, it is well appreciated that motor housing 20 constitutes a fluid-tight structure, as is well known in the art.

A motor shaft 25, having a rotor 26 affixed thereto, is rotatably carried within motor housing 20 with rotor 26 operatively located concentric with stator 14, as would be appreciated by one skilled in the art. The upper end of motor shaft 25 extends beyond upper housing ring 16 a sufficient distance to present splines 27 which suitably couple with the pump impeller shaft 30.

Motor shaft 25 is rotatably secured within motor housing 20 by lower bearing member 31 and upper bearing member 32. These bearing members each provide bearing support for both axial and radial loads. Furthermore, these bearing members provide accurate axial, radial and angular alignment of motor shaft 25 and rotor 26 relative to motor housing 20, and particularly stator 14. The specific structure of these bearing members will be discussed hereinbelow in greater detail so the unique features thereof can be appreciated by one skilled in the art.

Figure 2:
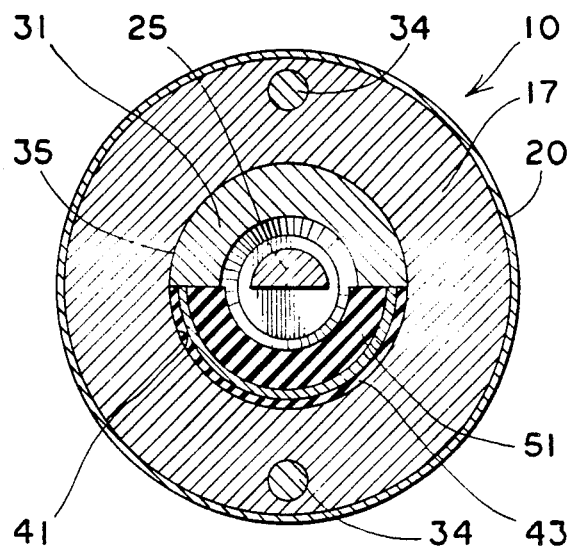
FIG. 2 is a cross-sectional view taken substantially along line 2—2 of FIG. 1.

Lower bearing member 31 preferably is a one-piece structure partially receivable within motor housing 20 through lower housing ring 17, as depicted in FIGS. 1 and 2. It is preferred that lower bearing member 31 be constructed from a material having a good strength to weight ratio as well as a low coefficient of friction and a low wear rate. Furthermore, the material should be capable of operating at elevated temperatures normally found in electric motors of this type.

Although lower bearing member 31 can be machined to the desired configuration, it is possible, and preferred, to mold this piece from a thermoplastic or other material having the desired qualities discussed above. For example, an amorphous thermoplastic polyetherimide, such as ULTEM 4000, has been found to be a suitable material (ULTEM is a registered trademark of General Electic Company).

Figure 4:
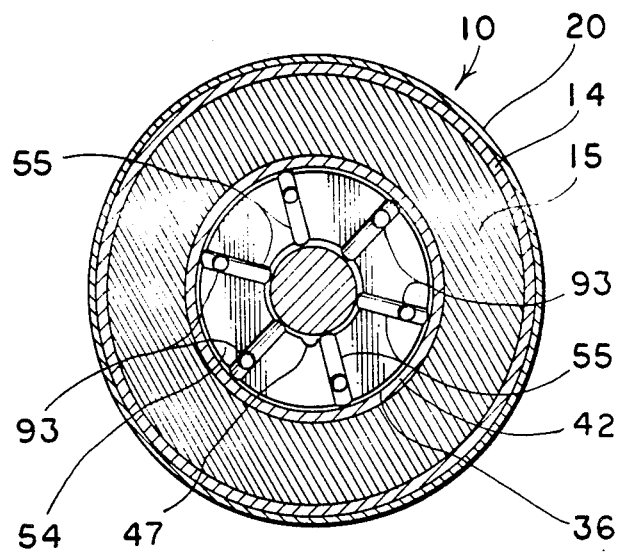
FIG. 4 is a cross-sectional view taken substantially along line 4—4 of FIG. 1.

An external flange 33 axially positions lower bearing member 31 within lower housing ring 17 for securement thereto using a plurality of retaining studs 34. An outboard pilot surface 35 and an inboard pilot surface 36 are formed about the outer surface of the body region 40 of lower bearing member 31 for alignment of lower bearing member 31 relative to lower housing ring 17 and stator 14, respectively. It should be appreciated that pilot surfaces 35 and 36 are each suitably sized and configured such that outboard pilot surface 35 bears uniformly against the inner cylindrical surface 41 of lower housing ring 17, as depicted in FIG. 2, while inboard pilot surface 36 bears uniformly against the inner cylindrical wall 42 of stator 14, as depicted in FIG. 4. An O-ring 43 is carried in a groove 44 about outboard pilot surface 35 to sealingly engage inner cylindrical surface 41, and thereby define a fluid-tight seal between lower bearing member 31 and motor housing 20.

It should be noted that the inner cylindrical wall 42 of stator 14 is relatively thin at the region where inboard pilot surface 36 makes contact, as this is in the vicinity of winding 15. Hence, the good friction and wear characteristics of the material from which lower bearing member 31 is constructed plays an important role in the successful operation of the disclosure. With such desirable characteristics, lower bearing member 31 is not likely to wear through inner cylindrical wall 42 following extended operation of the motor 10, as may occur as a result of vibrations in the motor 10.

Figure 3:
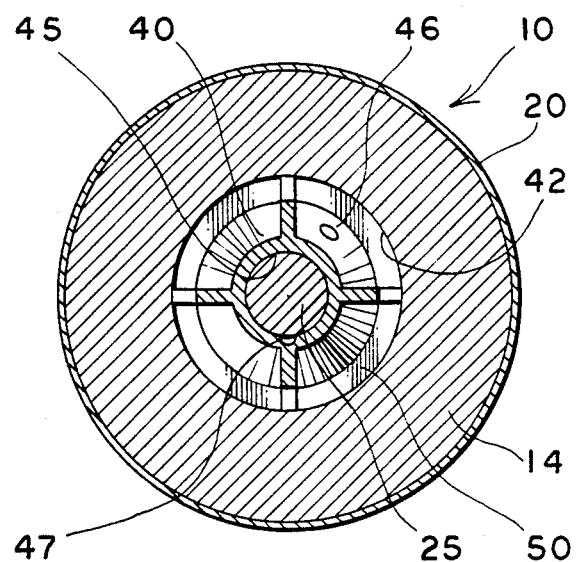
FIG. 3 is a cross-sectional view taken substantially along line 3—3 of FIG. 1.

A central, cylindrical bore 45 extends axially through body region 40 and intersects a coaxial conical cavity 46. Cylindrical bore 45 constitutes the radial bearing surface for rotatably receiving the lower end of motor shaft 25, as depicted in FIG. 3. A lubrication groove 47 extends axially along bore 45 for fluid to pass therethrough to lubricate and cool motor shaft 25 and bore 45 during operation. Similarly, a hole 49 extends through the wall of body region 40 in the vicinity of conical cavity 46 and communicates conical cavity 46 with an annular cavity 50 surrounding body region 40. Accordingly, hole 49 facilitates the flow of fluid, as will be appreciated hereinbelow.

Referring to FIGS. 1 and 2, conical cavity 46 is sealed at its outer end by a diaphragm seal 51 retained in a counter bore 52 with a retainer ring 53. It should be noted that diaphragm seal 51 can be replaced by any suitable means to close conical cavity 46 in a fluid-tight fashion, and may even be an integral wall of lower bearing member 31. Thus it should be appreciated that lower bearing member 31, in cooperation with O-ring 43 and diaphragm seal 51, effectively renders the lower end of motor housing 20 fluidtight.

The inner radial surface 54 of lower bearing member 31 carries a plurality of radial grooves 55, as depicted in FIG. 4, to facilitate the flow of cooling and lubricating fluid, as will be discussed hereinbelow. A lower bearing plate 56 is keyed to rotor 26, as by tabs 57 which engage notches 60 on rotor 26, so as to rotate with motor shaft 25. Bearing plate 56 is in juxtaposition with inner radial surface 54 when the motor 10 is assembled. In this manner, axial loads on motor shaft 25 are transferred to lower bearing member 31 through the interrelation of bearing plate 56 and inner radial surface 54.

Bearing plate 56 preferably is formed of a material having good load bearing strength and wear resistivity, and should be compatible to function as a bearing with the material from which lower bearing member 31 is formed. Specifically, a bearing plate 56 made from stainless steel sheet, or a similar non-corrosive metal, has been found to function quite well with a lower bearing member 31 formed of ULTEM 4000, as described above. This combination constitutes a lower bearing assembly which provides exceptionally good axial and radial load bearing capabilities along with highly accurate angular, axial and radial alignment of the lower end of motor shaft 25 relative to motor housing 20.

Upper bearing member 32 is functionally identical to lower bearing member 31 although there are structural differences as will be noted hereinbelow. Therefore, the foregoing discussion relating to lower bearing member 31 is equally applicable to upper bearing member 32, except as otherwise indicated.

Figure 5:
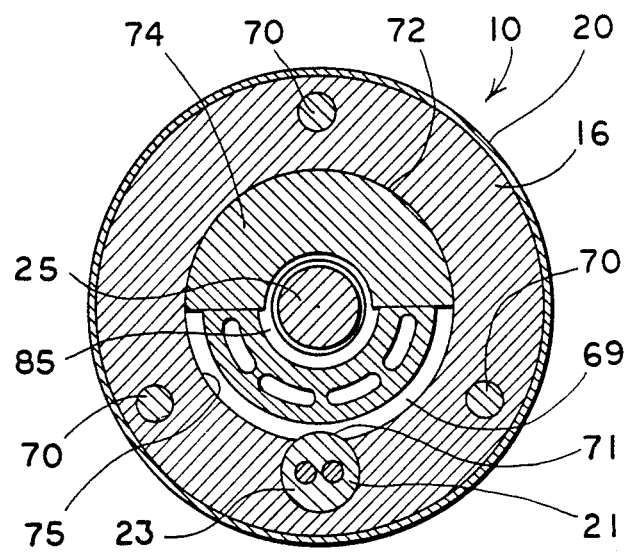
FIG. 5 is a cross-sectional view taken substantially along line 5—5 of FIG. 1.

Upper bearing member 32 preferably is a one-piece structure substantially received within motor housing 20 through upper housing ring 16, as depicted in FIGS. 1 and 5. Upper bearing member 32 preferably should be constructed of material having a good strength to weight ratio as well as a low coefficient of friction and good wear rate. The material also should be capable of withstanding elevated operating temperatures. A suitable material is ULTEM 4000, which further permits upper bearing member 32 to be injection molded, although upper bearing member 32 may be machined if so desired.

An annular rim 69 is located about the outboard end of upper bearing member 32 and serves not only to locate the axial position of upper bearing member 32 relative to motor housing 20 but also provides a pilot for radial alignment of pump assembly 11. Indeed, upper bearing member 32 is retained in motor housing 20 by pump assembly 11 when the latter is secured to upper housing ring 16 as by bolts 70. As depicted in FIG. 5, annular rim 69 may have a recess 71 to accommodate electrical connector 23. The existence of recess 71 and location of electrical connector 23, of course, will vary depending on the size of the motor. However, when constructed as shown, electrical connector 23 cooperated with recess 71 to prevent rotation of upper bearing member 32 relative to upper housing ring 16. It should be appreciated, though, that many alternative methods may be employed to prevent rotation of upper bearing member 32, and are within the scope of this disclosure.

Figure 7:
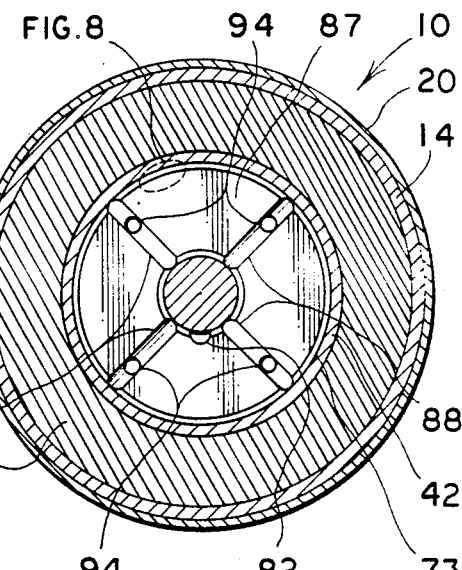
FIG. 7 is a cross-sectional view taken substantially along line 7—7 of FIG. 1.

Upper bearing member 32 is aligned within motor housing 20 by way of an outboard pilot surface 72 and an inboard pilot surface 73 which are formed about the outer surface of the body region 74. Inboard pilot surface 73 is suitably sized and configured to bear uniformly against the inner cylindrical wall 42 of stator 14, as depicted in FIG. 7, which inner wall 42, as discussed hereinabove, is relatively thin due to its proximity to winding 15. Outboard pilot surface 72, likewise, is suitably sized and configured to bear uniformly against the inner cylindrical surface 75 of upper housing ring 17, as depicted in FIG. 5. In addition, an O-ring 76 is carried in a groove 77 about outboard pilot surface 72 to seat against inner cylindrical surface 75 and to define a fluid-tight seal therewith.

Figure 6:
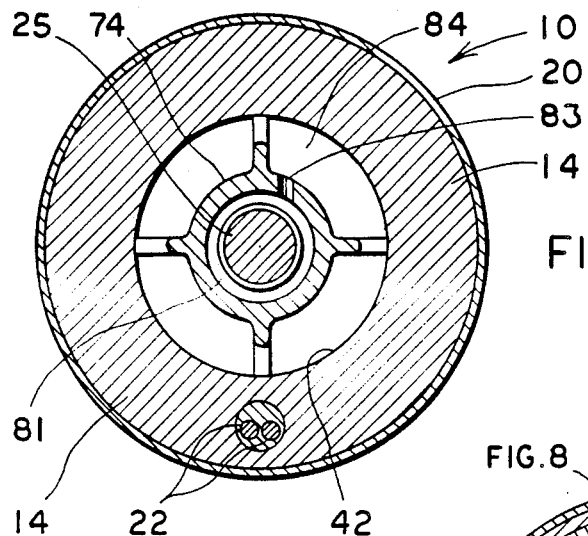
FIG. 6 is a cross-sectional view taken substantially along line 6—6 of FIG. 1.

With reference to FIG. 1, a central cylindrical bore 80 extends axially through body region 74 and intersects a larger, coaxial cavity 81. Cylindrical bore 80 constitutes the radial bearing surface for rotatably receiving the upper end of shaft 25. A lubrication groove 82 extends axially along bore 80 to permit fluid to pass therethrough to lubricate and cool motor shaft 25 and bore 80 during operation. A hole 83 also extends through the wall of body region 74 and communicates cavity 81 with an annular cavity 84 surrounding body region 74, as depicted in FIG. 6. Such hole 83 facilitates the flow of fluid, as will be discussed hereinbelow.

Coaxial cavity 81 is open at the outboard end of upper bearing member 32 so that the upper end of motor shaft 25 can protrude therefrom. A shaft seal 85 is carried in a counter bore 86 at the mouth of coaxial cavity 81. Shaft seal 85 engages motor shaft 25 to create a fluid-tight seal therewith, as depicted in FIG. 5. It should therefore be appreciated that upper bearing member 32 in cooperation with O-ring 76 and shaft seal 85 effectively makes the upper end of motor housing 20 fluid-tight.

The inner radial surface 87 of upper bearing member 32 carries a plurality of radial grooves 88, as depicted in FIG. 7, to facilitate the flow of cooling and lubricating fluid as will be discussed hereinbelow. An upper bearing plate 90, preferably identical to lower bearing plate 56, is keyed to rotor 26, as by tabs 91 which engage notches 92 on rotor 26, so as to rotate with motor shaft 25. Bearing plate 90 may be in juxtaposition with, or slightly spaced axially from, inner radial surface 87 when the motor 10 is assembled. In this manner, axial loads upward on motor shaft 25 are resisted by upper bearing member 32 through the interrelation of upper bearing plate 90 and inner radial surface 87. Furthermore, it should be appreciated that upper bearing member 32 and upper bearing plate 90, in cooperation with lower bearing member 31 and lower bearing plate 56 control the angular, axial and radial position of rotor 26 relative to stator 14.

The unique features of lower bearing member 31 and upper bearing member 32, hereinabove discussed, may be more fully appreciated upon consideration of the operation of a motor 10 incorporating such bearing members. Specifically, a motor 10 assembled as hereinabove described would include the additional feature of being filled with a fluid which acts as a cooling and lubricating medium. Such a fluid should exhibit good cooling and lubricating characteristics and should be compatible with all the internal components of the motor with which it will come in contact. While many different types of fluids are available for use in this fashion, and are well known to one skilled in the art, a suitable fluid has been found to be a mixture of water and propylene glycol, with the quantity of propylene glycol preferably being approximately 35% by weight. This mixture has been found to be quite viscous with the water functioning primarily as a lubricant and heat sink. The propylene glycol serves as an antifreeze agent for the water, primarily during shipping and storage of the motor 10, although it, too, may afford some lubrication to the motor.

In operation, the majority of axial loading on motor shaft 25 generally is downward and is resisted by lower bearing member 31. Upper bearing member 32 resists upward loads as they may occur. With the interior of the motor 10 being filled with the cooling and lubricating fluid, it is appreciated that such fluid will flow through the axial and radial lubricating grooves on the respective bearing members. As such, the fluid will lubricate and remove heat from the respective axial and radial bearing surfaces. In addition, the fluid will lubricate the inboard and outboard pilot surfaces of the respective bearing members thereby reducing the likelihood of wear in these regions.

Circulation of the fluid may be facilitated with axial holes 93 and 94 respectively interconnecting radial grooves 55 and 88, respectively, with annular cavities 50 and 84, respectively. The fluid can then flow from the radial grooves through the axial holes into the respective annular cavities. From there, the fluid can flow through holes 49 and 83, respectively, to conical cavity 46 and coaxial cavity 81, respectively, so as to enter the respective lubricating groove 55 and 82 in the respective cylindrical bore 45 and 80.

Figure 8:
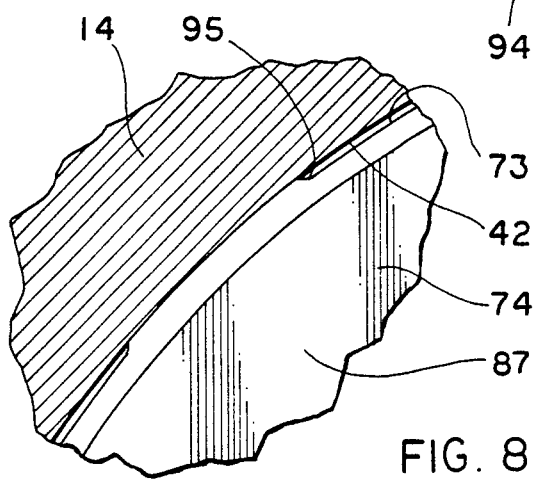
FIG. 8 is an enlarged cross-section of the region indicated in FIG. 7.

In addition, to facilitate precise alignment of the contact region between inboard pilot surfaces 36 and 73, respectively, and inner cylindrical wall 42 of stator 14, a plurality of spaced piloting pads 95, as depicted in FIG. 8, may be formed about the periphery of inboard pilot surfaces 36 and 73, respectively. Such piloting pads 95 may have a radial thickness of up to approximately 0.003 inch (0.008 cm) and a circumferential length of approximately 0.25 inch (0.64 cm). As such, piloting pads 95 will permit a snug fit between the respective inboard pilot surface, 36 and 73, and inner cylindrical wall 42 while assuring precise concentricities between motor shaft and motor stator.

With the foregoing disclosure, it should be appreciated that the present invention affords many desirable features heretofore unattainable; and further achieves the various objects of the invention. Indeed, the unique structure of the bearing members withstand axial and radial loading of the motor shaft, while exhibiting substantially low friction. Furthermore, the inboard and outboard pilot surfaces ensure accurate and continued angular, axial and radial alignment of the motor shaft and rotor relative to the stator and motor housing. Also, the one-piece construction of the bearing members provides ease of manufacture and greater reliability in use. In cooperation with seals and O-rings, the bearing members create a fluid-tight motor for use in submerged environments and allow for the motor to be filled with a cooling and lubricating liquid.

It should further be appreciated that the foregoing description merely sets forth an exemplary, preferred embodiment of the invention. It should be apparent to one skilled in the art that modifications may be made to the disclosed embodiment without departing from the concept of the present invention, and such modifications are contemplated and incorporated herein.

Thus, it should be evident that a unitary bearing member, and motor incorporating the same, according to the concept of the invention disclosed herein carries out the various objects of the invention and otherwise constitutes an advantageous contribution to the art.

What is claimed is:

1. A bearing system for a motor having a housing and a rotor shaft, comprising:
   a first unitary bearing member located proximate to a first end of the motor, and rotatably receiving the rotor shaft, said first bearing member having a body region, first and second outer radial alignment surfaces for aligning said body region relative to the housing, a radial bearing surface for resisting radial forces from the rotor shaft and an axial bearing surface for resisting axial forces in a first direction;
   means for securing said first bearing member to the housing;
   a first bearing plate fixed to the rotor shaft for rotation therewith, said first bearing plate being positioned in opposition to said axial bearing surface of said first bearing member;
   a second unitary bearing member axially displaced from said first bearing member with the rotor shaft rotatably received by and passing axially through said second bearing member, said second bearing member having a body region, first and second outer radial alignment surfaces for aligning said body region relative to the housing, a radial bearing surface for resisting radial forces from the rotor shaft, and an axial bearing surface for resisting axial forces in a second direction;
   means for securing said second bearing member to the housing; and
   a second bearing plate fixed to the rotor shaft for rotation therewith, said second bearing plate being positioned in opposition to said axial bearing surface of said second bearing member.

2. A bearing system, according to claim 1, further comprising means for effecting a fluid-tight seal between said first bearing member and the housing; means for effecting a fluid-tight seal between said second bearing member and the housing; and means for effecting a fluid-tight seal between said second bearing member and the rotor shaft.

3. A bearing system, according to claim 2, wherein said first and second radial alignment surfaces for aligning said first bearing member are coaxial with, and axially spaced from, each other about said body region of said first bearing member.

4. A bearing system, according to claim 3, wherein said means for effecting a fluid-tight seal between said first bearing member and the housing includes a circumferential groove about said first radial alignment surface of said first bearing member and an O-ring seal carried in said groove in sealing engagement with the housing.

5. A bearing system, according to claim 2, wherein said first and second radial alignment surfaces for aligning said second bearing member are coaxial with, and axially spaced from, each other about said body region of said second bearing member.

6. A bearing system, according to claim 5, wherein said means for effecting a fluid-tight seal between said second bearing member and the housing includes a circumferential groove about said first radial alignment surface of said second bearing member and an O-ring seal carried in said groove in sealing engagement with the housing.

7. A bearing system, according to claim 6, wherein said radial bearing surface of said second bearing member is a cylindrical bore and said means for effecting a fluid-tight seal between said second bearing member and the rotor shaft is a shaft seal located coaxially with said cylindrical bore.

8. A submersible motor, comprising:
   a housing having a first end, a second end and an inner support surface;
   a stator secured within said housing and having an inner wall;
   a shaft having a rotor secured thereto, said shaft and rotor being receivable within said housing with said rotor operatively aligned with respect to said stator, and with said shaft protruding axially from said second end of said housing;

first unitary bearing means located proximate to said first end of said housing, said first bearing means having a bore to rotatably receive said shaft, means to align said first bearing means relative to said housing and means to align said first bearing means relative to said stator; and second unitary bearing means located proximate to said second end of said housing, said second bearing means having a through bore to rotatably receive said shaft, means to align said second bearing means relative to said housing and means to align said second bearing means relative to said stator.

9. A submersible motor, according to claim 8, wherein said first unitary bearing means further includes a first body region, said means to align said first bearing means relative to said housing including a first pilot surface about said first body region engageable with said support surface of said housing, and said means to align said first bearing means relative to said stator including a second pilot surface about said first body region engageable with said inner wall of said stator, said second pilot surface of said first body region being coaxial with, and axially spaced from, said first pilot surface of said first body region.

10. A submersible motor, according to claim 9, further comprising a first bearing plate fixed to said shaft for rotation therewith, said first unitary bearing means having an axial bearing surface positioned in opposition to said first bearing plate for resisting axial forces in a first direction.

11. A submersible motor, according to claim 10, further comprising a second bearing plate fixed to said shaft for rotation therewith, said second unitary bearing means having an axial bearing surface positioned in opposition to said second bearing plate for resisting axial forces in a second direction.

12. A submersible motor, according to claim 9, further comprising means for effecting a fluid-tight seal between said first bearing means and said housing.

13. A submersible motor, according to claim 12, wherein said means for effecting a fluid-tight seal includes a circumferential groove about said first pilot surface of said first bearing means and an O-ring seal carried in said groove in sealing engagement with said housing.

14. A submersible motor, according to claim 9, wherein said second unitary bearing means further includes a second body region, said means to align said second bearing means relative to said housing including a first pilot surface about said second body region engageable with said support surface of said housing, and said means to align said second bearing means relative to said stator including a second pilot surface about said second body region engageable with said inner wall of said stator, said second pilot surface of said second body region being coaxial with, and axially spaced from, said first pilot surface of said second body region.

15. A submersible motor, according to claim 14, further comprising means for effecting a fluid-tight seal between said second bearing means and said housing, and means for effecting a fluid-tight seal between said second bearing means and said shaft.

16. A submersible motor, according to claim 15, wherein said means for effecting a fluid-tight seal between said second bearing means and said housing includes a circumferential groove about said first pilot surface of said second bearing means and an O-ring seal carried in said groove in sealing engagement with said housing, and wherein said means for effecting a fluid-tight seal between said second bearing means and said shaft includes a shaft seal located coaxially with said through bore.

* * * * *